US009622505B2

(12) United States Patent
Gaulin et al.

(10) Patent No.: US 9,622,505 B2
(45) Date of Patent: Apr. 18, 2017

(54) SYSTEM AND METHOD TO PRODUCE MAPLE SYRUP

(71) Applicant: H2O Innovation Inc., Québec (CA)

(72) Inventors: Rock Gaulin, Victoriaville (CA); Pierre Courtois, Victoriaville (CA)

(73) Assignee: H2O Innovation Inc., Quebec (CA)

( * ) Notice: Subject to any disclaimer, the term of this patent is extended or adjusted under 35 U.S.C. 154(b) by 386 days.

(21) Appl. No.: 14/209,588

(22) Filed: Mar. 13, 2014

(65) Prior Publication Data

US 2014/0261395 A1  Sep. 18, 2014

Related U.S. Application Data

(60) Provisional application No. 61/782,679, filed on Mar. 14, 2013.

(51) Int. Cl.
*A23L 1/09* (2006.01)
*A23L 1/015* (2006.01)
(Continued)

(52) U.S. Cl.
CPC ............... *A23L 29/30* (2016.08); *A23L 5/20* (2016.08); *A23L 5/21* (2016.08); *B01D 61/02* (2013.01);
(Continued)

(58) Field of Classification Search
CPC .......... A23L 1/09; A23L 1/015; A23L 1/0151; A23L 29/30; A23L 5/20; A23L 5/21;
(Continued)

(56) References Cited

U.S. PATENT DOCUMENTS 3,836,457 A   9/1974   Gross et al.
4,959,237 A   9/1990   Walker
(Continued)

FOREIGN PATENT DOCUMENTS

CA   2308966 A1   11/2001
CA   2600091 A1   2/2009
(Continued)

OTHER PUBLICATIONS

Wilson Andalécio de Araujo and Maria Regina Wolf Maciel, "Reverse Osmosis Concentration of Orange Juice Using Spiral Wound Membranes", Alim. Nutr., Araraquara, v.16, n.3, p. 213-219. Jul./Sep. 2005, From the Internet at : http://serv-bib.fcfar.unesp.br/seer/index.php/alimentos/article/viewFile/470/437.
(Continued)

*Primary Examiner* — David A Reifsnyder
(74) *Attorney, Agent, or Firm* — Norton Rose Fulbright US LLP

(57) ABSTRACT

The process of producing maple syrup from maple sap can include concentrating the maple sap to a sugar content of between 30 and 50° Brix using membrane filtration, including increasing a differential pressure of the membrane filtration in accordance with an increasing of an osmotic pressure as the sugar content increases to eventually reach the sugar content of between 30 and 50° Brix; and subjecting the concentrated maple sap having a sugar content of between 30 and 50° Brix to evaporation until it transforms into maple syrup.

30 Claims, 4 Drawing Sheets

(51) Int. Cl.
| | |
|---|---|
| B01D 61/02 | (2006.01) |
| B01D 61/08 | (2006.01) |
| C13B 25/00 | (2011.01) |
| C13B 20/16 | (2011.01) |
| A23L 29/30 | (2016.01) |
| A23L 5/20 | (2016.01) |

(52) U.S. Cl.
CPC ........... *B01D 61/022* (2013.01); *B01D 61/08* (2013.01); *C13B 20/16* (2013.01); *C13B 25/00* (2013.01)

(58) Field of Classification Search
CPC ......... C13B 25/00; C13B 20/16; B01D 61/02; B01D 61/022; B01D 61/08
See application file for complete search history.

(56) References Cited

U.S. PATENT DOCUMENTS

| | | | |
|---|---|---|---|
| 5,266,202 | A | 11/1993 | Okonogi et al. |
| 6,187,200 | B1 | 2/2001 | Yamamura et al. |
| 6,291,000 | B1 | 9/2001 | Hayakawa |
| 6,372,049 | B1 | 4/2002 | Shimanskaya et al. |
| 7,794,547 | B2 | 9/2010 | Mann |
| 8,025,799 | B2 * | 9/2011 | Cote ........................ A23L 2/085 210/121 |
| 2011/0220564 | A1 * | 9/2011 | Cote ........................ B01D 61/08 210/136 |
| 2013/0266991 | A1 | 10/2013 | Kanamori et al. |

FOREIGN PATENT DOCUMENTS

| | | |
|---|---|---|
| CA | 2642050 A1 | 4/2009 |
| CA | 2731522 A1 | 4/2009 |
| CA | 2703199 A1 | 11/2010 |
| CA | 2733617 A1 | 9/2011 |
| CA | 2752403 A1 | 3/2012 |
| CN | 101270372 A | 4/2008 |
| CN | 102814121 | 12/2012 |
| IN | 00431DE2003 | 3/2003 |
| JP | 58198299 | 11/1983 |
| JP | 5228000 | 9/1993 |
| JP | 2003259900 | 9/2003 |
| WO | 2013126662 A1 | 8/2013 |

OTHER PUBLICATIONS

S.S. Madaeni and S. Zereshki. "Reverse Osmosis : an Energy Saving Option in Sugar Industry", Presented at EUROMEMBRANE 2006, Sep. 24-28, 2006, Giardini Naxos, Italy.
Gul, Saeed & Hasek, Michael, "Energy saving in sugar manufacturing through the integration of environmentally friendly new membrane process for thin juice pre-concentration", Applied Thermal Engineering, vol. 43 (Oct. 2012), pp. 128-133.
Sabik, Hassan; Fortin, Jacinthe & Martin, Nathalie, "Identification of pyrazine derivatives in a typical maple syrup using headspace solid-phase microextraction with gas chromatography—mass spectrometry", Food Chemistry, vol. 133, issue 3 (Aug. 2012), pp. 1006-1010.
Li, Liya & Seeram, Navindra P., "Quebecol, a novel phenolic compound isolated from Canadian maple syrup", Journal of Functional Foods, vol. 3, issue 2 (Apr. 2011), pp. 125-126.
Greenough, J.D.; Fryer, B.J. & Mallory-Greenough, L., "Trace element geochemistry of Nova Scotia (Canada) maple syrup", Canadian Journal of Earth Sciences, vol. 47, issue 8 (2010), pp. 1093-1110.
Berg, Abby K. van den (et al.), "Air injection into concentrated maple sap during processing: impact on syrup composition and flavour", Journal of the Science of Food and Agriculture, vol. 89, issue 10 (Aug. 2009), pp. 1770-1774.
Aider, Mohammed & De Halleux, Damien, "Passive and microwave-assisted thawing in maple sugar cryoconcentration technology", Journal of Food Engineering, vol. 85, issue 1 (Mar. 2008), pp. 65-72.
Aider, M.; De Halleux, D.; Belkacemi, K. & Brunet, S., "Contribution to the improvement of maple sugar production", Journal of Food Engineering, vol. 80, issue 8 (Jun. 2007), pp. 798-804.
Aider, M.; De Halleux, D. & Belkacemi, K., "Production of granulated sugar from maple syrup with high content of inverted sugar", Journal of Food Engineering, vol. 80, issue 3 (Jun. 2007), pp. 791-797.
Ngadi, M.O. & Yu, L.J., "Rheological properties of Canadian maple syrup", Canadian Biosystems Engineering, vol. 46 (2004) pp. 3-15-3-18.
Favreau, D.; Sosle, V. & Raghavan, G.S.V., "Microwave processing of maple sap to maple syrup and maple syrup products", Journal of Microwave Power and Electromagnetic Energy, vol. 36, issue 1 (2001), pp. 25-35.
Saeed Gul, Michael Harasek, "Energy Savings in Sugar Manufacturing with the Implementation of a new Membrane Process", Conference: 14th International Conference on Process Integration, Modelling and, vol. 25, Jan. 2011, all pages, Austria.
Berg, A.K. van den (et al.), "Effects of air injection during sap processing on maple syrup color, chemical composition and flavor volatiles", International Sugar Journal, vol. 111, No. 1321 (2009), pp. 37-42.
Berg, Abby K. Van Den (et al.), "Effects of producing maple syrup from concentrated and reconstituted maple sap of different sugar concentrations", International Sugar Journal, vol. 113, No. 1345 (2011), pp. 35-44.
Berg, A.K. van den (et al.), "Maple syrup production with sap concentrated to high levels by membrane separation: effects on syrup chemical composition and flavor", International Sugar Journal, vol. 114, No. 1364 (2012), pp. 572-576.

\* cited by examiner

SYSTEM AND METHOD TO PRODUCE MAPLE SYRUP

CROSS-REFERENCE TO RELATED APPLICATIONS

The present application claims priority to U.S. Provisional Patent Application 61/782,679, filed Mar. 14, 2013.

FIELD

The improvements generally relate to the field of maple syrup production.

BACKGROUND

To produce maple syrup, the sugar content of maple sap, which can be between 1 and 3° Brix at the time of harvesting for instance, must be brought to a much higher (denser) concentration, typically around 65-70° Brix. Traditionally, this was entirely done through evaporation. FIG. 1 shows a typical prior art evaporator 10 including two evaporation stages 14, 16, both positioned above a combustion chamber 12 to receive heat from combusting wood or the like. The first evaporation stage 14, commonly referred to as a folded pan 14a, or flue pan, had an increased area of heat transfer due to the presence of folds 18, and was used to bring the sugar content to about 45° Brix in a reasonable amount of time. The second evaporating stage 16, commonly referred to as a flat pan 16a, was used subsequently to the folded pan 14a for the delicate final stage of transforming the concentrated maple sap into maple syrup without burning it, during which stage the sugar content was raised from ~45° Brix to ~65-70° Brix. It will be understood that evaporating requires a substantial amount of energy, usually obtained from the combustion of wood or oil, and which is reflected in the final cost of maple syrup.

In an effort to reduce the energy and costs associated to evaporation, a reverse osmosis stage 20 has been introduced upstream of the folded pan 14a. Essentially, reverse osmosis uses at least one separator 22 provided in the form of a pressure-resistant housing 24 (often cylindrical) containing a selective membrane 26. Fresh maple sap is fed into the separator 22 under pressure, and water, referred to as a filtrate 28, is extracted from the maple sap across the membrane 26, thereby yielding maple sap to a higher degree of concentration (typically between 13 to 20° Brix nowadays) prior to evaporation. The concentrated maple sap is then fed to the folded pan 14a where it can be concentrated to around 45° Brix using a significantly lesser amount of energy. The reduction of energy consumption does not only come from the fact that the maple sap fed into the evaporator 10 is already closer to the desired density, but also from the fact that the significant amount of water filtrate 28, which is extracted during reverse osmosis, significantly reduces the volume of sap entering the evaporator, thereby reducing the volume of sap which requires to be evaporated.

Notwithstanding the apparent advantages, it took several years for the use of reverse osmosis to become widespread. Maple syrup producers feared that its presence in the process would affect the taste, color, or overall quality of the final maple syrup product. Today, it is generally accepted to concentrate the maple sap to between 13 and 20° Brix using a reverse osmosis separator at a pressure between 300-500 psi prior to evaporation, and many industrial production plants are so equipped. Typically, the pressure is maintained by a combination of a pump 32 provided upstream of the membrane 26, and a valve 34 positioned in the concentrate outlet line, prior to releasing the concentrate to atmospheric pressure. A recirculation pump 30 is typically used to artificially increase the flow rate of maple sap across the separator 22 to increase the overall flow rate of production. The filtrate 28, which may still contain a low concentration of sugar, is disposed of.

Although energy saving considerations provide an incentive to increase the maple sap concentration even more prior to evaporation, attempting to do so faced those who tried to challenges which remain unaddressed. Henceforth, although the introduction of the afore-mentioned technology has represented a significant advancement in the production of maple syrup, there remained room for improvement.

SUMMARY

Several challenges required to be overcome in order to pursue the research and development efforts. For instance, maple sap can lose its freshness relatively fast, and the maple sap harvesting season is typically quite short. In order to broaden the possibilities of performing experiments on maple sap transformation, some preliminary tests were done using diluted maple syrup until favourable results were achieved, increasing the likelihood of success of the confirmation experiments conducted during the actual maple sap harvesting season. Moreover, it was understood that increasing the sugar content to a higher level required increasing the pressure against the membrane, but membranes and other hardware such as separator housings and connection tubes previously used in the field of Maple Syrup production were typically limited at 600 psi, which required significant adaptation.

Early experiments conducted above 600 psi using a traditional arrangement modified only to accommodate higher pressures led to production of a higher sugar content, but only worked for a short time, the membrane becoming clogged quite rapidly, significantly affecting the potential industrial applicability.

This limitation was overcome, and the sugar content of maple sap was successfully brought above 30° Brix.

In accordance with one embodiment, this was achieved by a continuous process including a sequence of two or more membrane filtration stages rather than a single stage, where each stage operated at a corresponding, successively higher, differential pressure across its at least one membrane. In other words, it was discovered that one source of membrane clogging resulted from attempts to produce a high sugar content increase using a single stage. In particular, to yield maple sap having a concentration above 30° Brix, the required pressure differential across the at least one membrane of the second stage for uninterrupted operation was above 700 psi.

The latter discovery met limited advantages, because it was also found that evaporation using the folded pan did not work well when the maple sap fed into the inlet thereof was above 20° Brix, and the problems encountered with the folded pan became worse and worse as the inlet sugar content was increased. Problems encountered included: precipitation of solid sugar material on the stainless steel of the folded pan, which was extremely difficult to clean; and premature commencement of the chemical reactions leading to the transformation of the maple sap into maple syrup, evidenced by foaming, which led to burning of the maple sap. The treatment of mid-sugar-content maple sap, e.g. at 35° Brix, directly in the flat pan evaporator faced several inconveniences, such as the amount of time required to bring 35° Brix maple sap to maple syrup in a flat pan evaporator which was found unacceptable in many embodiments.

From this latter finding, it was understood to reap the most benefits, a leap had to be achieved across a relatively large sugar content gap. The sugar content would need to be brought up to between 40° and 50° Brix, preferably about 45° Brix, i.e. the level normally achieved by the folded pan evaporator.

It was found that the sugar content of maple sap could be brought above 40° Brix in a continuous process by using a sequence of at least three of the membrane filtration stages, and even reach the ~45° Brix level referred to above, thereby rendering the entire folded pan evaporation stage unnecessary. To this end, the differential pressure across the at least one membrane in the last stage was above 900 psi. Moreover, tests were done in which maple sap concentrated to this level using such a membrane filtration sequence was fed directly into the flat pan evaporation stage, which yielded a maple syrup quality which was deemed satisfactory.

In accordance with another embodiment, this was achieved in a batch process where the pressure across the at least one membrane of a membrane filtration stage is progressively increased as the maple sap is recirculated against it, until the desired sugar content is obtained.

In both the continuous process and the batch process referred to above, the differential pressure of the membrane filtration is increased in accordance with the increasing osmotic pressure, as the sugar content increases to eventually reach the desired concentration at a higher differential pressure. The osmotic pressure can be referred to as the pressure required to produce a given flow rate of filtrate across the membrane at a given sugar content, and this osmotic pressure increases as the sugar content increases.

In accordance with one aspect, there is provided a process of producing maple syrup from maple sap, the process comprising concentrating the maple sap to a sugar content of between 30 and 50° Brix using membrane filtration, including increasing a differential pressure of the membrane filtration in accordance with an increasing of an osmotic pressure as the sugar content increases to eventually reach the sugar content of between 30 and 50° Brix; subjecting the concentrated maple sap having a sugar content of between 30 and 50° Brix to evaporation until it transforms into maple syrup.

In accordance with another aspect, there is provided a system to produce maple syrup, the system comprising: at least one membrane filtration stage operable to concentrate the maple sap to a sugar content of between 30 and 50° Brix and to increase a differential pressure of the membrane filtration in accordance with an increase of an osmotic pressure as the sugar content increases to eventually reach the sugar content of between 30 and 50° Brix; a flat pan evaporator stage connectable to the at least one membrane filtration stage to directly receive the concentrated maple sap at the sugar content of between 30 and 50° Brix.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
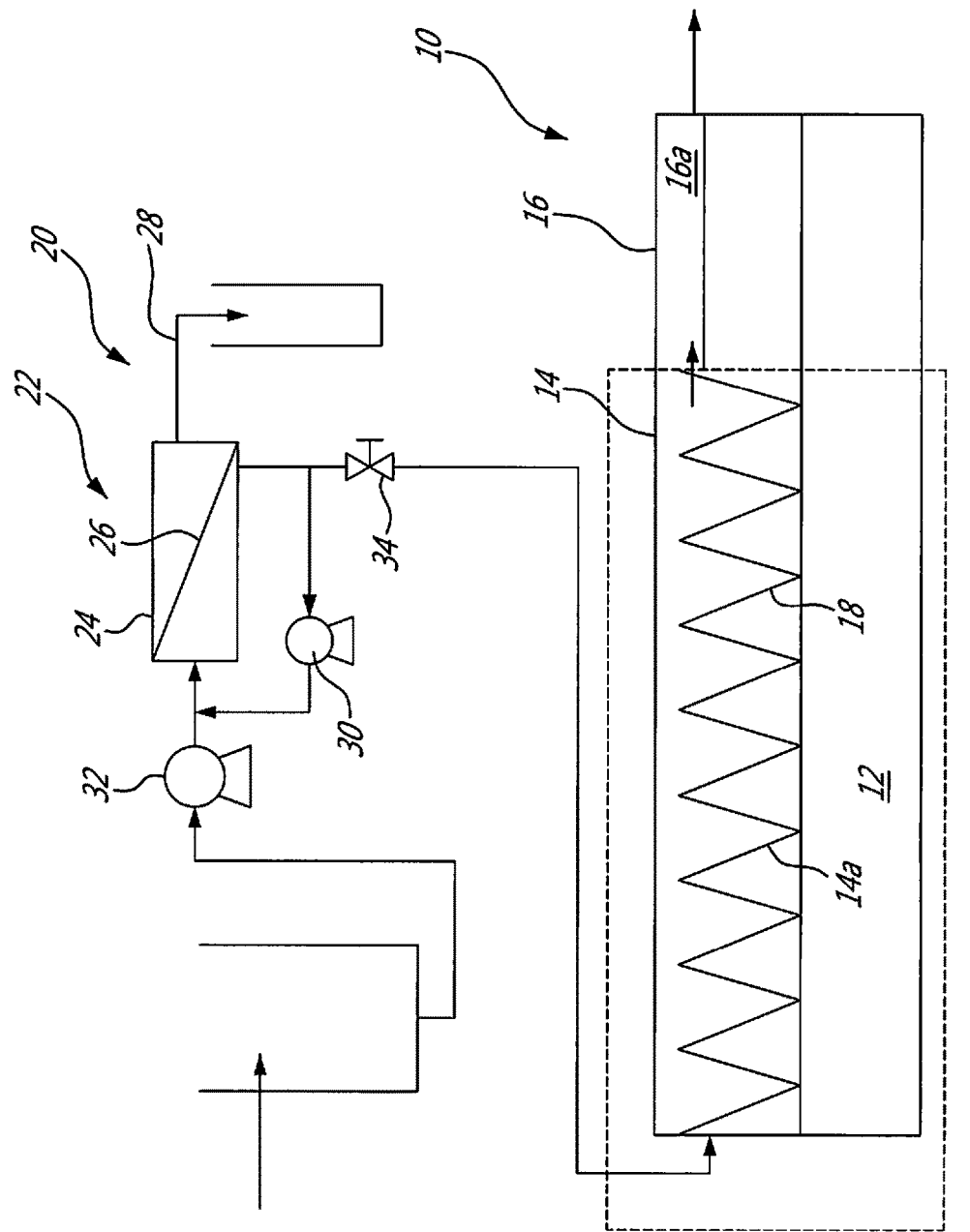
FIG. 1 is a schematic view of an example of a maple syrup production plant having a single membrane filtration stage, in accordance with the prior art.
Figure 2:
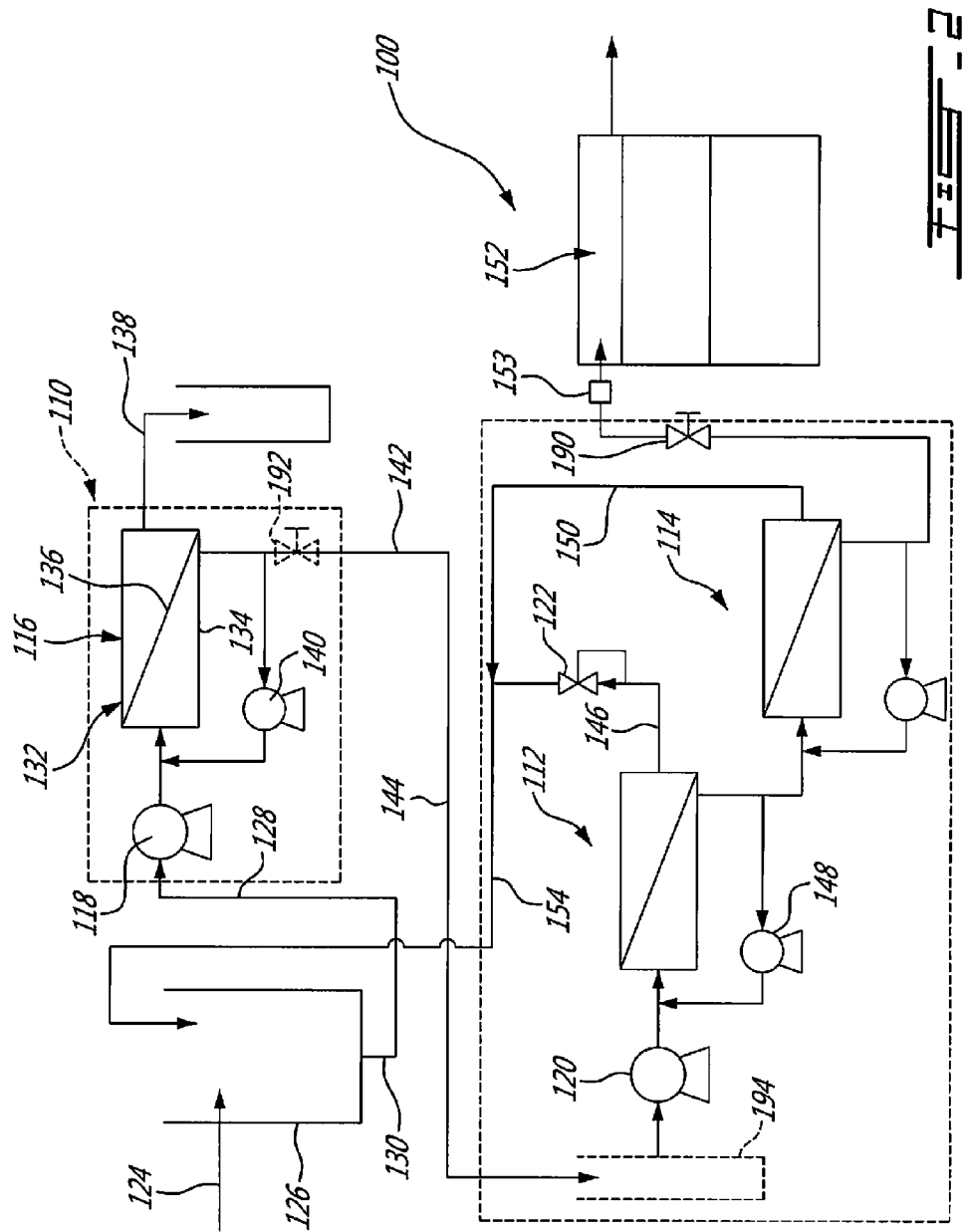
FIG. 2 is a schematic view showing an example of a maple syrup production plant having a sequence of three membrane filtration stages.

FIG. 2 shows an example of a maple syrup production plant 100 having a sequence of three membrane filtration stages 110, 112, 114, which will be referred to in this example as a first membrane filtration stage 110, a second membrane filtration stage 112, and a third membrane filtration stage 114, for convenience, although the expressions first, second and third are not intended to associate a given stage to any particular position in the sequence or in a maple syrup production line in the appended claims. The expressions anterior stage and subsequent stage are used herein to refer to any two adjacent stages in the sequence. Each one of the three membrane filtration stages 110, 112, 114 in the illustrated sequence has at least one separator 116. Moreover, hardware, essentially consisting in this example of pumps 118, 120 and valves 122, 192, 190, is provided to allow operation of each successive stage 110, 112, 114 at a corresponding, incremental, pressure differential across the respective membrane(s). The example depicted in FIG. 2 will be described in detail, although it will be understood that this is done solely for the purpose of providing a complete description. Alternate embodiments are possible, some examples of which will be discussed. For instance, a different number of membrane filtration stages can be used in alternate embodiments, and although the three stages illustrated in FIG. 2 are adapted to a continuous process, a batch process can be used instead.

In this example, fresh maple sap 124 (at its unaltered sugar content of between 1 and 3° Brix) is collected in an associated reservoir 126. The first membrane filtration stage 116 has an inlet 128 connected to the fresh maple sap reservoir 126, which can be done by tubing 130. In this example each one of the first 116, second 112 and third 114 membrane filtration stages can be reverse osmosis stages for instance, and each include at least one separator 132, each separator 132 of each stage having one or more associated membranes 136 received in an associated pressure-resistant housing 134 (adapted to withstand the operating pressures), an inlet 128, a filtrate outlet 138, a recirculation conduit and pump 140, and a concentrate outlet 142. If more than one separator 132 is used in any one of the three stages, the separators of the given stage are connected in parallel, i.e. they share a common entry pressure (which can be substantially the same as the concentrate pressure), and a common filtrate outlet pressure, in a manner for all membranes of the given stage have substantially the same pressure differential thereacross. The expression 'substantially the same pressure', in this context, refers to normal variations which can occur from one parallel separator to another and which does not significantly affect the satisfactory operation of the stage. In this embodiment, the filtrate outlet of the first membrane filtration stage leads to a waste reservoir, and is disposed of.

During use, a given entry flow rate of maple sap at a first sugar content is drawn from the reservoir 126 into the first membrane filtration stage 110. A differential pressure is set across the at least one membrane 136 by the hardware, including the first pump 118 and a valve, which also maintains the given entry flow rate. A given flow rate of filtrate exits the first membrane filtration stage 110 through the filtrate outlet 138, and a given concentrate flow rate output of maple sap at a second, higher, sugar content exits the concentrate outlet 142. If the concentrate outlet 142 leads directly to atmospheric pressure, such as by feeding in a reservoir 194 a valve 192 is also used to maintain the differential pressure. Alternately, if the reservoir 194 is not present, the valve can be positioned further in the system, such as at the location of valve 190 for instance.

In this example, the initial sugar content of the fresh maple sap in the reservoir 126 can be of 2° Brix, the differential pressure across the separator 116 can be of 600 psi, the concentrate flow rate output can be of 4 US gpm, and the second sugar content can be of 20° Brix, for instance. The given concentrate flow rate output of maple sap is then fed into the second membrane filtration stage 112, which can be done via associated tubing 144, for instance. It will be understood that given the higher associated inlet flow rate in the first membrane filtration stage 110, the first membrane filtration stage 110 will typically be engineered accordingly using a plurality of separators 132, either in parallel or in series. A first membrane filtration stage 110 such as described in this example can be a typical single reverse osmosis stage of a prior art application, which can occur when a second 112 and third 114 membrane filtration stages are retro-fitted to an existing industrial maple syrup production plant. In alternate embodiments, it will be understood that the first membrane filtration stage 110 can be specifically adapted to the process as a whole.

In a general manner, the second membrane filtration stage 112 has a greater differential pressure across its at least one membrane than the differential pressure in the first membrane filtration stage, to bring the maple sap to a correspondingly higher sugar content, since the osmotic pressure is higher once the sugar content has been raised by the first membrane filtration stage 110. The second membrane filtration stage 112 increases the sugar content of the maple sap by yet extracting more filtrate 146 from the concentrate flow rate output from the first stage. Similarly, the third membrane filtration stage 114 receives the concentrate flow rate output from the second stage 112, and has an even greater differential pressure across its at least one membrane to further raise the sugar content of the maple sap to a correspondingly higher sugar content.

In this example, the increase of differential pressure in the second membrane filtration stage 112 is achieved by the hardware, including an associated second pump 120, which raises the pressure from 500 psi to 2000 psi. A back pressure valve 122, of 200-400 psi in this case, is used downstream of the filtrate outlet 146, setting a pressure differential of, say, 1000 psi across the at least one membrane of the second membrane filtration stage 112. The corresponding at least one recirculation circuit and pump 148 can recirculate 30-60 US gpm between the concentrate outlet and the inlet, to yield a filtrate flow rate of 1.6 US gpm from the filtrate outlet 146, for instance. Henceforth, a concentrate flow rate output of 2.4 US gpm can be obtained from the second stage 112, which can have a sugar content of 35° Brix in this example.

In this example, the increase of differential pressure in the third membrane filtration stage 114 compared to the second membrane filtration stage 112 (to accommodate the still higher osmotic pressure), is achieved simply by the absence of a back pressure valve in its filtrate outlet path 150, thus applying the entire inlet pressure onto the corresponding at least one membrane, in a manner which can avoid the inconveniences which can be associated to the use of a booster pump between the stages. The pressure differential across its at least one membrane is therefore of 2000 psi. The recirculation pump can recirculate 30-60 US gpm to yield a filtrate flow rate of 0.6 US gpm and a concentrate flow rate output of 1.8 US gpm, which can have a sugar content of 45° Brix, for instance.

In this example, the concentrate flow rate output of 1.8 US gpm, having a sugar content of 45° Brix, is directly fed to a flat pan evaporator stage 152 in the sense that the example maple syrup production plant 100 entirely omits the presence of a folded pan evaporator stage. The expression 'directly', in this context, can be understood to mean 'without an intermediate sugar-content-increasing stage'. This allows to save installation costs, and also in maintenance costs since the cleaning of a folded pan evaporator stage after the season can be time-consuming and/or costly. In alternate embodiments, it will be understood that the maple sap can be directly fed into a flat pan evaporator stage at an intermediate sugar content, e.g. 35° Brix, however feeding a flat pan evaporator at such an intermediate sugar content will typically lead to longer evaporation times, an inconvenience which can likely be remedied to a certain extent by extending the size of the flat pan evaporator. In alternate embodiments, for instance, the final sugar content at the output of the final membrane filtration stage can be between 35 and 55° Brix, for instance, and the operating differential pressure of the second, subsequent, or final membrane filtration stage can be between 700 and 3000 psi, for instance.

In the embodiment shown in FIG. 2, a heater 153 is used between the membrane filtration stage 114 and the and the flat pan evaporator stage 152 to increase the temperature of the concentrated maple sap prior to flat pan evaporation. In fact, the prior folded pan evaporator not only concentrated the maple sap but also heated it, while the membrane filtration did not provide the same heating effect. It was found that providing 'cold' concentrated maple sap into the flat pan evaporator could cause issues, and these issues could be solved, by using the heater 153. In fact, heating the concentrated maple sap to, say, about 180° F. at the outlet of the membrane filtration stage can allow to produce a concentrated maple sap input which essentially mimics prior art concentrated maple sap input from the folded pan evaporator stage, both in terms of sugar content and in terms of temperature.

In order to accommodate the flow rates mentioned relative to the specific example provided above, the third membrane filtration stage 114 was satisfactorily provided with a single separator having a single membrane and housing, whereas the second membrane filtration stage 112 was provided with two separators connected in parallel to both the pump 120, the back pressure valve 122, and the third membrane filtration stage 114; each one of the separators having its associated membrane, housing, and recirculation circuit and pump.

In the embodiment described above, the 'water' 154 which is extracted from the filtrate outlets of the second 112 and third stage 114 still had a certain, though relatively minor, concentration of sugar therein. In cases where the flow rates through the second and/or a subsequent stage is significantly lower than the flow rate through the first stage, and the sugar content thereof is significant (e.g. between 0.1 and 2° Brix), it can be worthwhile to return the filtrate into the fresh maple sap reservoir, to then combine it into inlet of the first stage, for the process to continue to concentrate the sugar thereof. This was done for the filtrate of the second and third stage in this example and was found to allow recuperating some sugar content without any notable inconveniences.

Figure 3:
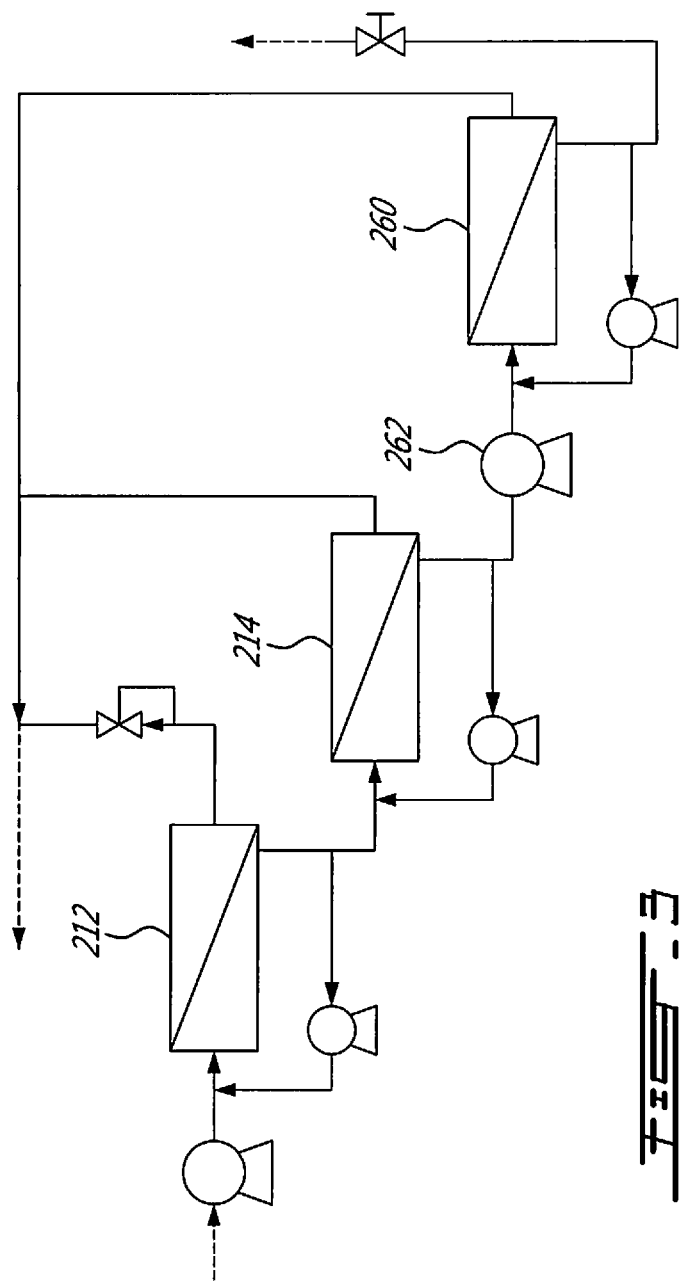
FIG. 3 is a schematic view showing an alternate example of a portion of the maple syrup production plant of FIG. 2.

In alternate embodiments, different flow rates can be accommodated. For very large applications, it can make sense to add an additional membrane filtration stage in the sequence, such as to take smaller incremental steps in sugar content (and associated differential pressure) between the stages. FIG. 3 shows an example of such an alternate embodiment, where the second 212 and third 214 membrane filtration stages are similar to the ones described above, but a fourth membrane filtration stage 260 was added to receive the output of the third membrane filtration stage 214. In this example, a booster pump 262 is used between the third membrane filtration stage 214 and the fourth membrane filtration stage 260 to reach the corresponding higher differential pressure in the fourth membrane filtration stage 260 compared to the third membrane filtration stage 214. In smaller applications, such as the one described above, it could be preferable to maintain the number of stages at a feasible minimum to avoid component redundancy.

The hardware used to impart the successively increasing differential pressures along the sequence of membrane filtration stages can vary in alternate embodiments. For instance, the embodiment shown in FIG. 2 can be modified by increasing the pressure of the first pump 118, adding a back pressure valve to the filtrate outlet 138, removing the back pressure valve 122 and the pump 120, and adding a booster pump between the second stage 112 and the third stage 114, for example.

It will be understood that the value of the sugar content at the output of each stage can be adapted and/or otherwise vary in alternate embodiments, and that the associated differential pressure and flow rates may vary accordingly. A good indication that the differential pressure and flow rates are well adapted to a given 'step' in the sugar content increase of a given stage, is that the associated membrane(s) do(es) not clog, or at least do(es) not clog regularly. For instance, the undertaken experiments did not yet allow to discover any configuration which could take the sugar content from 2° Brix to ~45° Brix with less than three stages—all two-stage configurations tested led to membrane clogging within at most two hours. Although it is preferably avoided altogether, it was found that occasional clogging can be dealt with by adding a flush valve at the concentrate outlet of any given separator or stage, and the flush valve can be operated to flush some concentrate while the pressure pump continues its operation, in a manner to bring the pressure differential below 50 psi. This was found to satisfactorily unclog the membrane to allow subsequent use in many cases.

Although FIGS. 2 and 3 show alternate embodiments of continuous processes, it will be understood that a batch process can be used in alternate embodiments.

Figure 4:
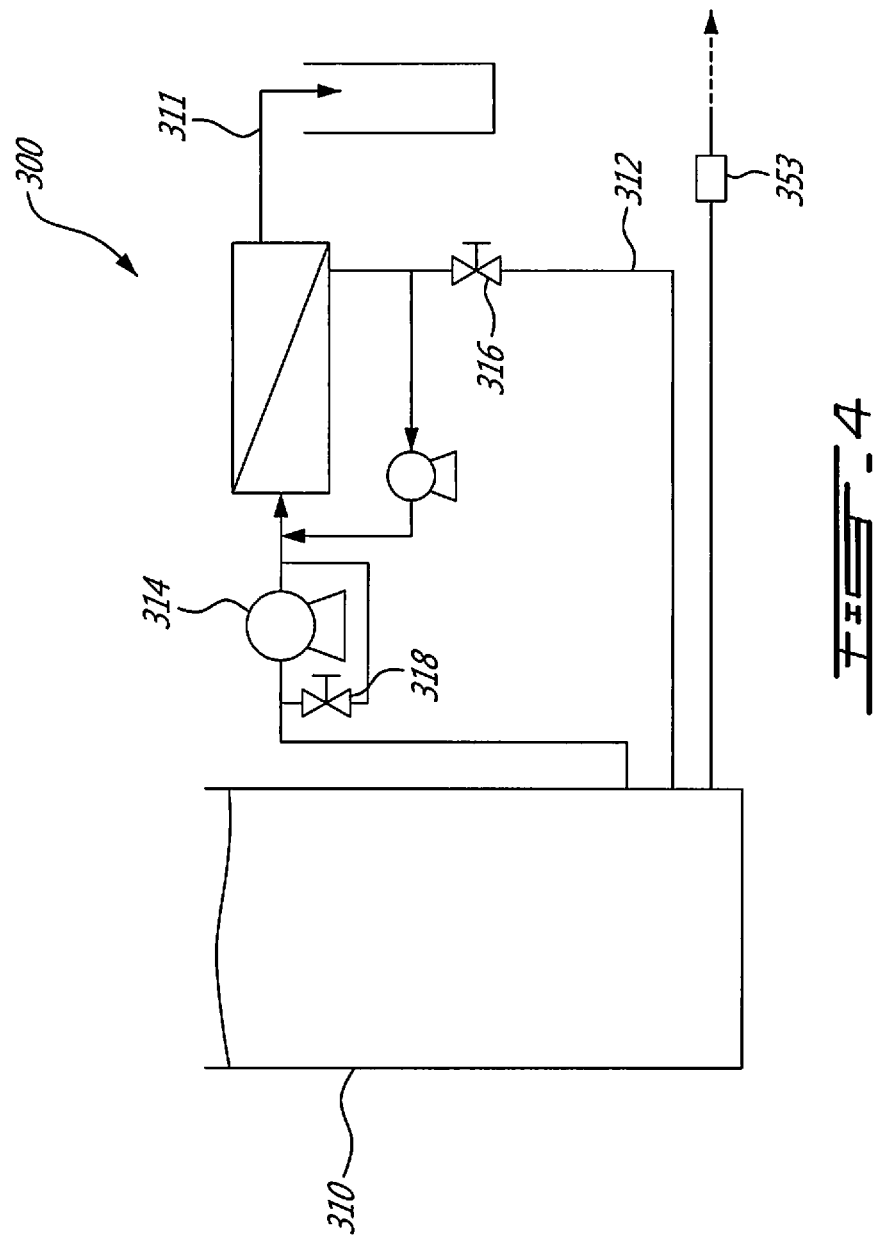
FIG. 4 is a schematic view showing an other alternate example of a portion of a maple syrup production plant of FIG. 2.

FIG. 4 shows an example of a membrane filtration stage 300 which can increase the sugar concentration in a batch process. For instance, in FIG. 4, a sugar containing liquid such as maple sap for instance can be received in a reservoir 310. The membrane filtration stage 300 can be similar to a membrane filtration stage described above, for instance, and a filtrate outlet flow is extracted from a filtrate outlet 311. However, in this embodiment, the concentrate outlet 312 is returned to the reservoir 310, leading to a progressively reduced volume and increasing sugar content in the reservoir 310, and the differential pressure imparted by the pump 314 and valve 316 is progressively increased as the sugar content increases, in order to account for the change in the osmotic pressure stemming from the increasing sugar content. If the membrane filtration stage 300 is arranged to yield a constant filtrate output, for instance, the increase in the sugar content, and the corresponding increase in the osmotic pressure, can be modelized, and used as an indication to automatically control the pressure increase. The pressure increase can stem from a variation of RPM of the pump, and/or by adjusting a flow bypassing the pump using a bypass valve 318, for example. The progressive increase in the differential pressure can be done continuously, or can be done by 'step' increases of pressure, as considered satisfactory in view of specific applications. It can be useful in certain embodiments to use a low pressure pump upstream of the pump 314, for instance. An optional heater 353 can also be used here to produce heated concentrated maple sap into the flat pan evaporator stage if desired.

In the case of typical maple syrup production plant, such a 'batch' membrane filtration stage 300 can be used as a second or subsequent stage, for instance, and can be used to replace the combination of membrane filtration stages 112 and 114 shown in FIG. 2, or instead of the combination of membrane filtration stages 212, 214, 260 shown in FIG. 3, for example, in which case it can be used to increase the sugar content of maple sap in a reservoir such as reservoir 194 on FIG. 2, for example. In such an embodiment, the maple sap in the reservoir can be fed directly to a flat pan evaporator once it has reached a desired sugar content. Optionally, the filtrate can be returned to the reservoir 126, for instance.

The membrane filtration can be reverse osmosis or nanofiltration for instance. The associated membranes can be soft water desalination membranes, reverse osmosis membranes, or nanofiltration membranes, as can be found suitable to filter a selected molecule size. In the case of maple syrup production, the selected molecule size can be of around 0.001 micron, for instance.

As can now be understood, the examples described above and illustrated are intended to be exemplary only. The scope is indicated by the appended claims.

What is claimed is:

1. A system to produce maple syrup, the system comprising:
    a fresh maple sap source providing maple sap at a sugar content between 1 and 3° Brix,
    at least one membrane filtration stage connected to directly receive the maple sap from the fresh maple sap source and operable to concentrate the maple sap to a sugar content of between 30 and 50° Brix and to increase a differential membrane pressure in accordance with an increase of an osmotic pressure as the sugar content increases to eventually reach the sugar content of between 30 and 50° Brix; and
    a flat pan evaporator stage connected to the at least one membrane filtration stage to directly receive the concentrated maple sap at the sugar content of between 30 and 50° Brix.

2. The system of claim 1 further comprising a heater operable to heat the concentrated maple sap prior to the flat pan evaporator stage.

3. The system of claim 2 wherein the heater is configured to heat the concentrated maple sap to about 180° F.

4. The system of claim 1 wherein the at least one membrane filtration stage includes
    a sequence of at least three communicating membrane filtration stages, each one of the at least three communicating membrane filtration stages including an inlet, a filtrate outlet, and a concentrate outlet, the maple sap being successively concentrated to a higher and higher sugar content across the at least three communicating membrane filtration stages, each one of the at least three communicating membrane filtration stages having at least one respective membrane, with hardware to operate each one of the at least three communicating membrane filtration stages to a successively increasing pressure across a corresponding at least one respective membrane;

wherein the flat pan evaporator stage is connected to directly receive the concentrate outlet of the last communicating membrane filtration stage in the sequence.

5. The system of claim 1 further comprising a maple sap container connected to an inlet of a sequence of at least three communicating membrane filtration stages, wherein a second or subsequent one of the at least three communicating membrane filtration stages in the sequence has a filtrate outlet which leads into the maple sap container.

6. The system of claim 1 wherein the at least one membrane filtration stage includes an anterior membrane filtration stage and a subsequent membrane filtration stage adjacent each other in a sequence, further comprising a pump directly upstream of the anterior membrane filtration stage and the anterior membrane filtration stage includes a back pressure valve in a respective filtrate outlet.

7. The system of claim 1 wherein the at least one membrane filtration stage includes
a reservoir, and hardware to circulate liquid from the reservoir, against at least one membrane, and back to the reservoir, to extract a filtrate flow output from the at least one membrane by membrane filtration, and to progressively increase the pressure differential across the at least one membrane as the sugar content of the liquid in the reservoir progressively increases due to the extracting of the filtrate flow output, until the sugar content of the liquid in the reservoir reaches the sugar content of between 30 and 50° Brix.

8. The system of claim 1 wherein at least one of the at least one membrane filtration stages is operable at a differential membrane filtration pressure of at least 700 psi.

9. The system of claim 8, wherein at least one of the at least one membrane filtration stages is operable at a differential membrane filtration pressure of at least 800 psi.

10. The system of claim 1 wherein the sugar content of between 30 and 50° Brix is of between 40 and 50° Brix and wherein at least one of the at least one membrane filtration stages is operable at a differential membrane filtration pressure of at least 900 psi.

11. The system of claim 10, wherein at least one of the at least one membrane filtration stages is operable at a differential membrane filtration pressure of at least 1000 psi.

12. A process of producing maple syrup from maple sap, the process comprising
concentrating the maple sap to a sugar content of between 30 and 50° Brix using membrane filtration, including increasing a differential pressure of the membrane filtration in accordance with an increasing of an osmotic pressure as the sugar content increases to eventually reach the sugar content of between 30 and 50° Brix; and
subjecting the concentrated maple sap having a sugar content of between 30 and 50° Brix to evaporation until it transforms into maple syrup.

13. The process of claim 12 further comprising the step of heating the concentrated maple sap prior to the step of subjecting the concentrated maple sap to evaporation.

14. The process of claim 12 wherein the step of concentrating the maple sap to a sugar content of between 30 and 50° Brix using membrane filtration includes
concentrating a first entry flow rate of the maple sap from a first sugar content to a second, higher, sugar content using a first membrane filtration stage in which a first filtrate flow rate is extracted from the first entry flow rate across at least one first stage membrane, yielding a first concentrate flow rate output of maple sap at said second sugar content, the first membrane filtration stage having a first pressure differential across the at least one first stage membrane; and
concentrating the first concentrate flow rate output of maple sap from said second sugar content to a third, higher, sugar content using a second membrane filtration stage in which a second filtrate flow rate is extracted from the first concentrate flow rate across at least one second stage membrane, yielding a second concentrate flow rate output of maple sap at said third sugar content, the second membrane filtration stage having a second pressure differential across the at least one second stage membrane, the second pressure differential being higher than the first pressure differential.

15. The process of claim 14, further comprising: concentrating the second concentrate flow rate output of maple sap from said third sugar content to a fourth, higher, sugar content using a third membrane filtration stage in which a third filtrate flow rate is extracted from the second concentrate flow rate across at least one third stage membrane, yielding a third concentrate flow rate output of maple sap at said fourth sugar content, the third membrane filtration stage having a third pressure differential across the at least one second stage membrane, the third pressure differential being higher than the second pressure differential.

16. The process of claim 15 wherein at least one of the second filtrate flow rate and the third filtrate flow rate are returned into the first entry flow rate of the maple sap.

17. The process of claim 15 wherein the first sugar content is between 1 and 3° Brix, the second sugar content is between 8 and 20° Brix, the third sugar content is above 30° Brix, and the fourth sugar content is between 40 and 50° Brix.

18. The process of claim 14 wherein the first pressure differential is maintained by pumping upstream of the at least one first stage membrane.

19. The process of claim 18 wherein the second pressure differential is maintained higher than the first pressure differential by maintaining a back pressure in the first filtrate flow rate.

20. The process of claim 18 wherein the second pressure differential is maintained higher than the first pressure differential by using a booster pump.

21. The process of claim 12 wherein the step of concentrating the maple sap to a sugar content of between 30 and 50° Brix using membrane filtration includes
circulating maple sap from a reservoir against at least one membrane and back to the reservoir, and extracting a filtrate flow output from the at least one membrane by membrane filtration, and progressively increasing the pressure differential across the at least one membrane as the sugar content of the maple sap in the reservoir progressively increases due to the extracting of the filtrate flow output, until the sugar content of the maple sap in the reservoir reaches the sugar content of between 30 and 50° Brix.

22. The process of claim 21 further comprising concentrating a first entry flow rate of the maple sap from a first sugar content to a second, higher, sugar content using a first membrane filtration stage in which a first filtrate flow rate is extracted from the first entry flow rate across at least one first stage membrane, yielding a first concentrate flow rate output of maple sap at said second sugar content, the first membrane filtration stage having a first pressure differential across the at least one first stage membrane, the first pressure differential being lower than the pressure differential during said circulating; wherein the maple sap at said second sugar content is placed in said reservoir prior to said circulating.

23. The process of claim 22 wherein the first sugar content is of between 1 and 3° Brix and the second sugar content is of between 8 and 20° Brix.

24. The process of claim 21 wherein said increasing the pressure differential includes at least one of increasing a pumping speed of a pump positioned upstream of the at least one membrane and adjusting a bypass valve bypassing the pump.

25. The process of claim 12 wherein said increasing the differential pressure includes increasing the differential pressure to at least 700 psi.

26. The process of claim 25, wherein said increasing the differential pressure includes increasing the differential pressure to at least 800 psi.

27. The process of claim 12 wherein the sugar content of between 30 and 50° Brix is of between 40 and 50° Brix and said increasing the differential pressure includes increasing the differential pressure to at least 900 psi.

28. The process of claim 27 further comprising feeding the concentrated maple sap having a sugar content of between 40 and 50° Brix into a flat pan evaporator, wherein the evaporation is done using solely the flat pan evaporator.

29. The process of claim 27 wherein the sugar content of between 40 and 50° Brix is of about 45° Brix.

30. The process of claim 27, wherein said increasing the differential pressure includes increasing the differential pressure to at least 1000 psi.

* * * * *